Patented Dec. 4, 1923.

1,476,483

UNITED STATES PATENT OFFICE.

KATHERINE S. BORT, OF WASHINGTON, DISTRICT OF COLUMBIA.

COSMETIC CREAM.

No Drawing.  Application filed May 29, 1922. Serial No. 564,589.

*To all whom it may concern:*

Be it known that I, KATHERINE S. BORT, a citizen of the United States, residing at No. 1801 K Street NW., Washington, District of Columbia, and whose post-office address is No. 1801 K Street NW., Washington, District of Columbia, have invented a new and useful Cosmetic Cream, of which the following is a specification.

This invention relates to a cosmetic.

The object of the invention is an improved paste or cream which when applied to the skin and used according to these specifications and directions is capable of giving to the skin of pale or sallow persons a natural glow, health-like in aspect, which is desired and often sought for. The improved cream is not only quite harmless, even when applied to skins of the finer and more delicate textures but is really as beneficial and as easy of use as the ordinary non-tinted cold creams, cleansing creams and foundation creams, etc., of commerce.

This improved paste consists of a paste comprising essentially a main body of a non-tinted cleansing "cold cream" or "vanishing cream" (of trade) such as is usually found on the market and a small quantity of a non-injurious rouge-like material which is thoroughly worked and kneaded into the main body of cleansing cream or vanishing cream to form a body of material homogeneous in its constituents throughout. For example, I take a definite quantity of the ordinary commercial cleansing cream, vanishing cream, or foundation cream, etc., which is used for and applied to the skin and add to this a definite proportion and quantity of liquid rouge or red-powdered material. I then thoroughly knead and work the mixture until the paste is obtained of the desired consistency and which is homogeneous and permanent in composition throughout. The relative proportion of the rouge material necessary is quite small being determined by the tint desired—a lighter tint for blondes and a darker for brunettes.

The application and treatment is effected by applying the finished paste to the skin (as the face) and gently massaging and rubbing it into the pores. It is then removed from the face as by the use of a suitable cloth or equivalent, whereupon the skin assumes the invigorated aspect of a person in perfect health. The aspect or appearance is of a natural glow or flush and not that of a mere artificial surface rouge, and it lasts more or less indefinitely due to the penetration of the pores by the cleansing ingredients which are thoroughly kneaded into the skin but may be removed by the application of a non-tinted cold cream or ordinary washing of soap and water. The usual powder and rouge can be applied over this foundation, the object of this tinted foundation being to give to pale and sallow skins a more healthy and becoming tone.

I claim:

1. A cosmetic cream admixed with an innocuous coloring matter in sufficient proportion to produce a diffused tinting effect upon the skin after the cream has been applied thereto and then substantially removed therefrom.

2. A cleansing and cosmetic preparation of a creamy consistency comprising a main body of cosmetic cream and an innocuous coloring matter intimately mixed and incorporated therewith to form a paste of creamy consistency, which can be kneaded and worked harmlessly into the pores of the skin for thoroughly cleansing the pores and at the same time giving to the skin a diffused and natural health-like tint, after substantial removal of the cream in the cleansing operation.

In testimony whereof, I have signed my name to this specification.

KATHERINE S. BORT.